(12) United States Patent
Chen

(10) Patent No.: US 7,488,212 B2
(45) Date of Patent: Feb. 10, 2009

(54) TRANSCEIVER CAGE

(75) Inventor: Jian-Ping Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Chen, Taipei Hsien (TW)

( * ) Notice: Subject to any disclaimer, the term of this patent is extended or adjusted under 35 U.S.C. 154(b) by 0 days.

(21) Appl. No.: 11/616,890

(22) Filed: Dec. 28, 2006

(65) Prior Publication Data

US 2008/0102699 A1 May 1, 2008

(30) Foreign Application Priority Data

Oct. 27, 2006 (TW) .................................. 95139843

(51) Int. Cl.
*H01R 13/648* (2006.01)

(52) U.S. Cl. ..................... 439/607; 439/541.5; 361/800

(58) Field of Classification Search ................. 439/607, 439/541.5; 361/800, 816, 818; 174/350–355; 385/92

See application file for complete search history.

(56) References Cited

U.S. PATENT DOCUMENTS

| | | | | |
|---|---|---|---|---|
| 6,558,191 B2 * | 5/2003 | Bright et al. | ............. | 439/541.5 |
| 6,729,905 B1 * | 5/2004 | Hwang | ..................... | 439/607 |
| 6,866,544 B1 * | 3/2005 | Casey et al. | ................. | 439/607 |

\* cited by examiner

*Primary Examiner*—Renee Luebke
*Assistant Examiner*—Vanessa Girardi
(74) *Attorney, Agent, or Firm*—Wei Te Chung (57) ABSTRACT

A transceiver cage includes at least one first shield housing, at least one second shield housing, a top cover, and a bottom cover. The first shield housing includes a first upper wall, a first lower wall, and a pair of first sidewalls. The first upper wall, the first sidewalls, and the first lower wall cooperatively surround a first receiving space. The second shield housing stacked to the first shield housing, includes a second upper wall, a second lower wall, and a pair of second sidewalls. The top cover includes a top board, a rear board, and a pair of outer sideboards extending along the first sidewalls from the top board. The bottom cover includes a bottom board and a pair of inner sideboards lapping over the outer sideboards. The bottom cover is electronically connected with the top cover to receive the first shield housing and the second shield housing.

11 Claims, 9 Drawing Sheets

TRANSCEIVER CAGE

BACKGROUND OF THE INVENTION

1. Field of the Invention

The present invention relates to a cage for shielding electromagnetic interference, and specifically to a transceiver cage for shielding electromagnetic interference.

2. Description of Related Art

Transceiver modules provide bi-directional transmission of data between an electrical interface and an optical data link. The module receives electrical signals and converts them into optical signals that are then transmitted over the optical data link. The module also receives optical signals, converts them into electrical signals, and transmits the electrical signals to the electrical interface.

Normally, the transceiver module electronically connected to a metal transceiver cage assembly is mounted on a printed circuit board (PCB) of a host computer, an input/output system, a peripheral device, or a switch. The metal transceiver cage assembly functions to dissipate electrostatic buildup, and serves as an electromagnetic shield.

Figure 7:
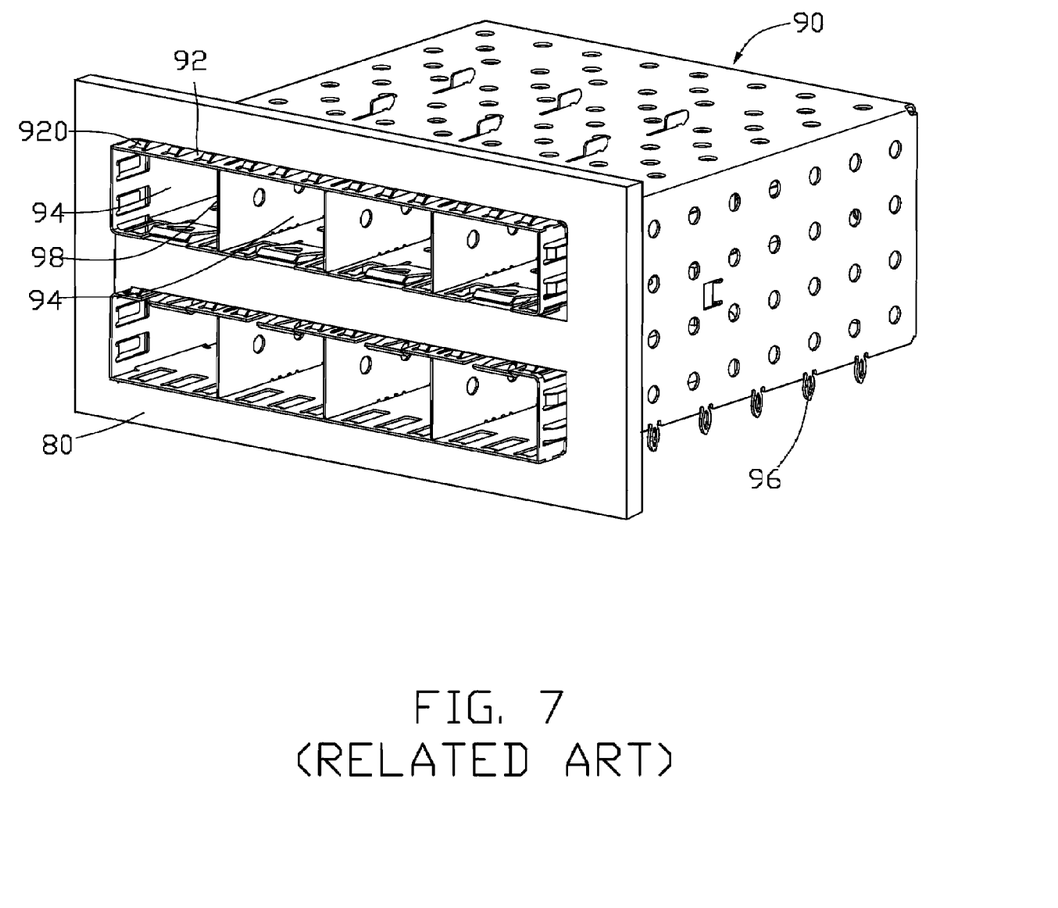
FIG. 7 is a perspective view of a conventional transceiver cage.

Referring to FIG. 7, a conventional transceiver cage 90 for shielding transceiver modules (not shown) therein, includes a front end 92, a plurality of receiving spaces 94, and a plurality of pins 96. The adjacent receiving spaces 94 are separated by one interior wall 98. The front end 92 is configured for inserting in a bezel 80 of a device (not shown). A plurality of grounding fingers 920 extend from the front end 92, and the grounding fingers 920 abut against edges of the bezel 80 and bound an opening of the bezel 80 after the transceiver cage 90 is assembled in the bezel 80. The pins 96 extend from a bottom wall of the transceiver cage 90, and are inserted into corresponding holes of a double-sided circuit board (not shown), and thus, the transceiver cage 90 is located on one side of the circuit board, and together the transceiver cage 90 and the circuit board are mounted in the device. Because there is no shielding for the other side of the circuit board, an interspace must be defined between the circuit board and an inside surface of the device to avoid solder or other elements on the other side of the circuit board contact with the inside surface of the device. This assembly of transceiver cage, circuit board, and required interspace is not efficient in the use of limited space within the device.

Therefore, a heretofore unaddressed need exists in the industry to overcome the aforementioned deficiencies and inadequacies.

SUMMARY OF THE INVENTION

In one aspect of the embodiment, a transceiver cage includes at least one first shield housing, at least one second shield housing, a top cover, and a bottom cover. The first shield housing includes a first upper wall, a first lower wall, and a pair of first sidewalls electronically connected to the first upper wall and the first sidewalls. Lengths of the first sidewalls are substantially equal to a length of the first upper wall, and a length of the first lower wall is less than the lengths of the first sidewalls and the first upper wall. The first upper wall, the first sidewalls, and the first lower wall cooperatively surround a first receiving space, and the first receiving space includes a front open end and a back open end. The second shield housing is stacked on the first shield housing. The second shield housing includes a second upper wall, a second lower wall, and a pair of second sidewalls electronically connected to the second upper wall and the second lower wall. Lengths of the second upper wall, the second sidewalls, and the second lower wall are substantially equal to the length of the first lower wall of the first shield housing. The top cover includes a top board, a pair of outer sideboards, and a rear board. The rear board is electronically connected with the top board and the outer sideboards, for shielding electromagnetic interference. The outer sideboards extend along the first sidewalls of the first shield housing from the top board. Heights of the outer sideboards are substantially equal to heights of the first sidewalls of the first shield housing. A plurality of fixing feet extend from edges of the outer sideboards. The bottom cover includes a bottom board and a pair of inner sideboards. Lengths of the bottom board and the inner sideboards are substantially equal to the length of the first lower wall of the first shield housing. The inner sideboards overlap the outer sideboards of the top cover. The bottom cover is electronically connected with the top cover to receive the first shield housing and the second shield housing.

Other advantages and novel features will become more apparent from the following detailed description when taken in conjunction with the accompanying drawings, in which:

DETAILED DESCRIPTION OF THE INVENTION

Figure 1:
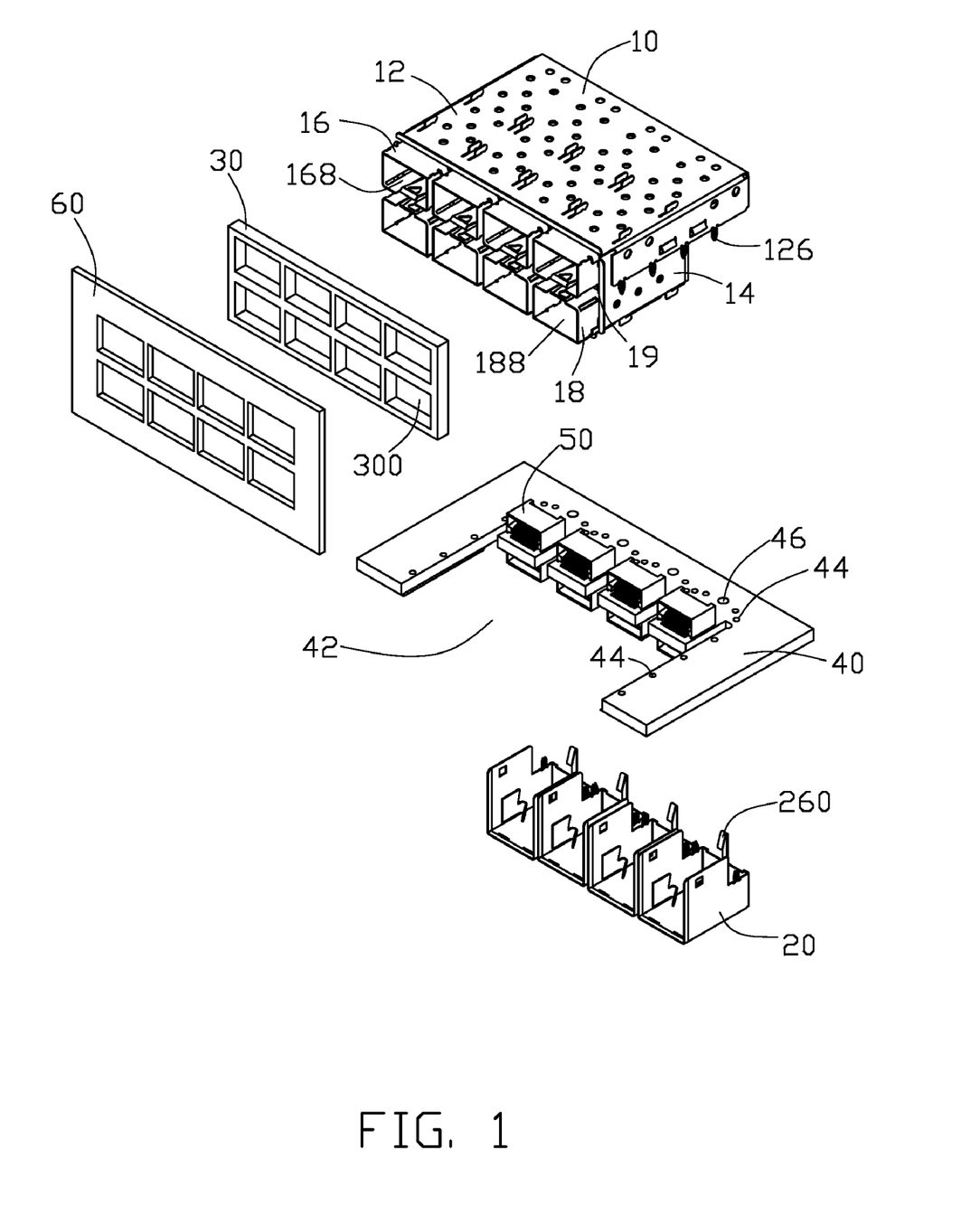
FIG. 1 is an exploded, perspective view of a transceiver cage assembled in a bezel in accordance with an exemplary embodiment of the present invention.

Referring to FIG. 1, a transceiver cage 100 assembled in a bezel 60 of a device (not shown) includes a main body 10, at least one shielding cover 20, a gasket 30, and a circuit board 40. In the exemplary embodiment, there are four shielding covers 20. The gasket 30 is disposed on a front end of the main body 10. The main body 10 combined with the shielding cover 20 is attached to the circuit board 40. The circuit board 40 has an aperture 42 for accommodating one part of the main body 10, and a plurality of connectors 50 mounted on the circuit board 40. The main body 10, together with the shielding cover 20, the gasket 30, the circuit board 40, and the connectors 50 is inserted into the bezel 60.

Figure 2:
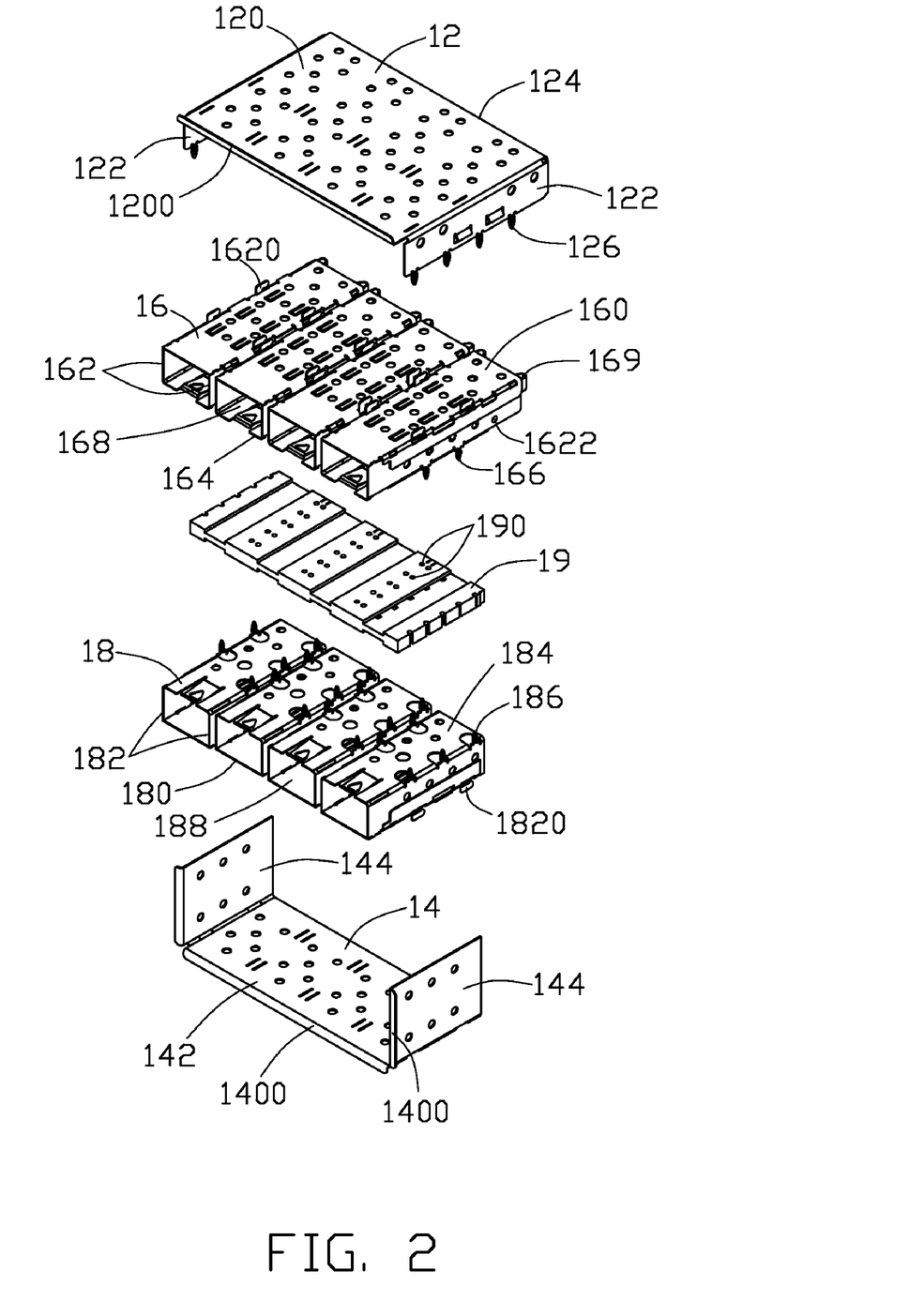
FIG. 2 is an exploded, perspective view of a main body of the transceiver cage of FIG. 1.

Referring also to FIG. 2, an exploded, perspective view of the main body 10 of the transceiver cage 100 of FIG. 1 is shown. The main body 10 includes a top cover 12, a bottom cover 14, at least one first shield housing 16, at least one second shield housing 18, and an interposed board 19. The top cover 12 is electronically connected to the bottom cover 14 to form an accommodating space for accommodating the first shield housing 16, the second shield housing 18, and the interposed board 19. The first shield housing 16 and the second shield housing 18 are disposed on opposite sides of the interposed board 19 respectively. In the exemplary embodiment, there are four first shield housings 16 and four second shield housings 18.

The first shield housings 16 each include a first upper wall 160, a first lower wall 164, and a pair of first sidewalls 162 electronically connected to the first upper wall 160 and the first sidewalls 162. Lengths of the first sidewalls 162 are substantially equal to a length of the first upper wall 160, a length of the first lower wall 164 is less than the lengths of the first sidewalls 162 and the first upper wall 160, and thus, an orifice 1642 is formed at one end of the first lower wall 164 (shown in FIG. 2A). In the exemplary embodiment, the first lower wall 164 and the first sidewalls 162 are formed integrally.

Figure 2A:
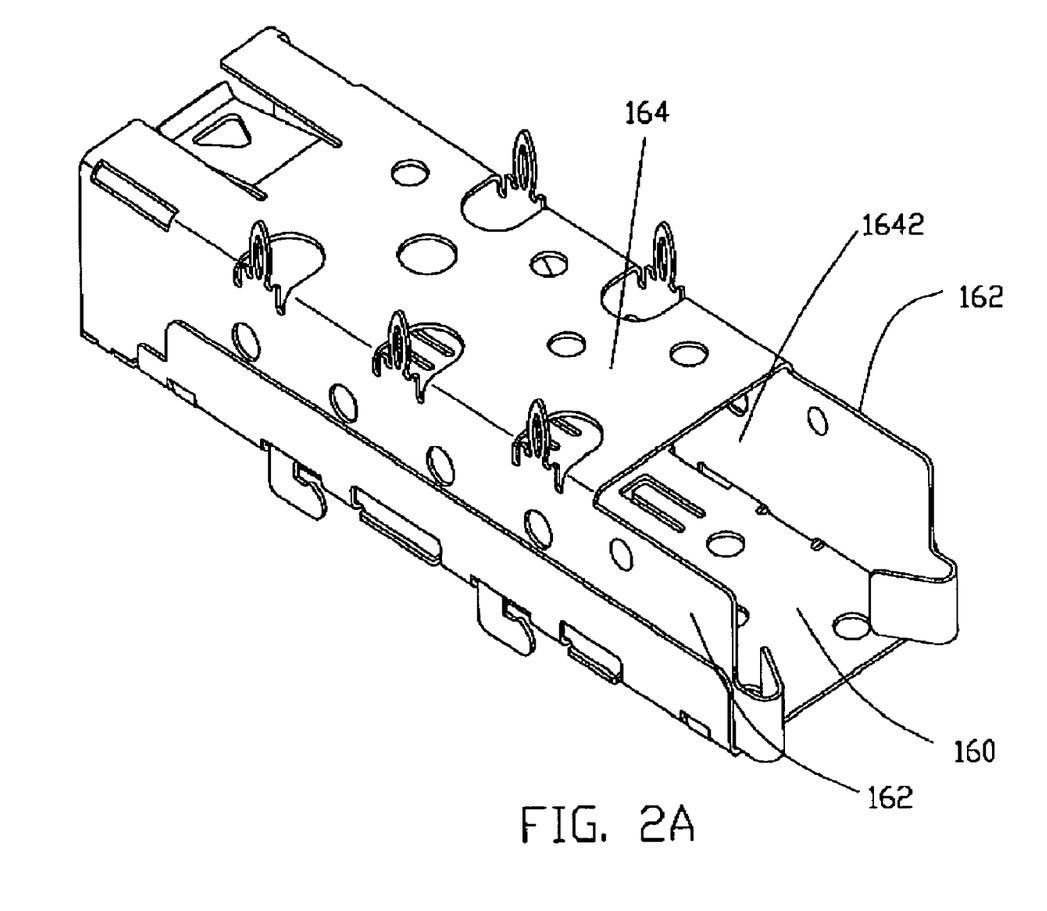
FIG. 2A is a perspective view of a first shield housing of the transceiver cage of FIG. 1.

A plurality of first tabs 1620 extend from one edge of each first sidewall 162 and pass through corresponding holes (not labeled) of the first upper wall 160, and thus, the first upper wall 160 is attached to the first sidewalls 162 via the first tabs 1620. The first upper wall 160, the first sidewalls 162, and the first lower wall 164 cooperatively surround a first receiving space 168 having a front open end and a back open end. The front open end is for receiving a transceiver module, and the orifice formed adjacent the first lower wall 164 communicates with the back open end. A plurality of fastening pins 166 extend from an opposite edge of each first sidewall 162, for inserting into corresponding inserting holes 190 of the interposed board 19. A pair of spring arms 169 respectively extend toward the back open end from the first sidewalls 162, for abutting against the transceiver module received in the first shield housing 16. A protrusion portion 1622 protrudes from each first sidewall 162, and the protrusion portion 1622 is dome-shaped.

The second shield housings 18 are stacked on the first shield housings 16 respectively, and each second shield housing 18 includes a second upper wall 180, a second lower wall 184, and a pair of second sidewalls 182 electronically connected to the second upper wall 180 and the second lower wall 184. Lengths of the second upper wall 180, the second sidewalls 182, and the second lower wall 184 are substantially equal to the length of the first lower wall 164 of the first shield housing 16 (shown in FIG. 6A). In the exemplary embodiment, the second lower wall 184 and the second sidewalls 182 are formed integrally.

A plurality of second tabs 1820 extend from one edge of each second sidewall 182 and pass through corresponding holes (not labeled) of the second upper wall 180, and thus, the second upper wall 180 is attached to the second sidewalls 182 via the second tabs 1820. The second upper wall 180, the second sidewalls 182, and the second lower wall 184 cooperatively surround a second receiving space 188 having a front open end and a back open end. A plurality of fastening pins 186 extend from an opposite edge of each second sidewall 182, for inserting into corresponding inserting holes 190 of the interposed board 19. A pair of latching members 1822 (shown in FIG. 5) extend from the second upper wall 180. The latching members 1822 are flat before assembling the transceiver cage 100, and are curved after assembling the transceiver cage 100.

The top cover 12 includes a top board 120, a pair of outer sideboards 122, and a rear board 124. The rear board 124 is electronically connected with the top board 120 and the outer sideboards 122, and covers the back open ends of the first shield housings 16, for shielding electromagnetic interference. The outer sideboards 122 extend along the first sidewalls 162 of the first shield housings 16 from the top board 120. Heights of the outer sideboards 122 are substantially equal to heights of the first sidewalls 162 of the first shield housings 16. In the exemplary embodiment, the top board 120, the outer sideboards 122, and the rear board 124 are formed integrally. A fringe 1200 is formed on an edge of the top board 120, and the fringe 1200 is electronically connected to the gasket 30 (shown in FIG. 1), after the gasket 30 mounted on the main body 10. A plurality of fixing feet 126 extend from the outer sideboards 122 and the rear board 124, for inserting into corresponding fixing holes 44 of the circuit board 40 (shown in FIG. 1). The rear board 124 includes at least one bent portion 1240 (shown in FIG. 4) bent from the rear board 124. In the exemplary embodiment, there are four bent portions 1240. The first tabs 1620 of the first shield housings 16 further pass through corresponding holes (not labeled) of the top board 120, and thus, the first shield housings 16 are attached to the top cover 12.

The bottom cover 14 includes a bottom board 142 and a pair of inner sideboards 144. Lengths of the bottom board 142 and the inner sideboards 144 are substantially equal to the length of the first lower wall 164 of the first shield housings 16. Three fringes 1400 are formed on edges of the bottom board 142 and the inner sideboards 144, and the fringes 1400 are electronically connected to the gasket 30 (shown in FIG. 1) after the gasket 30 is mounted on the main body 10. In the exemplary embodiment, the bottom board 142 and the inner sideboards 144 are formed integrally. The second tabs 1820 of the second shield housings 18 further pass through corresponding holes (not labeled) of the bottom board 142, and thus, the second shield housings 16 are attached to the bottom cover 14.

Figure 3:
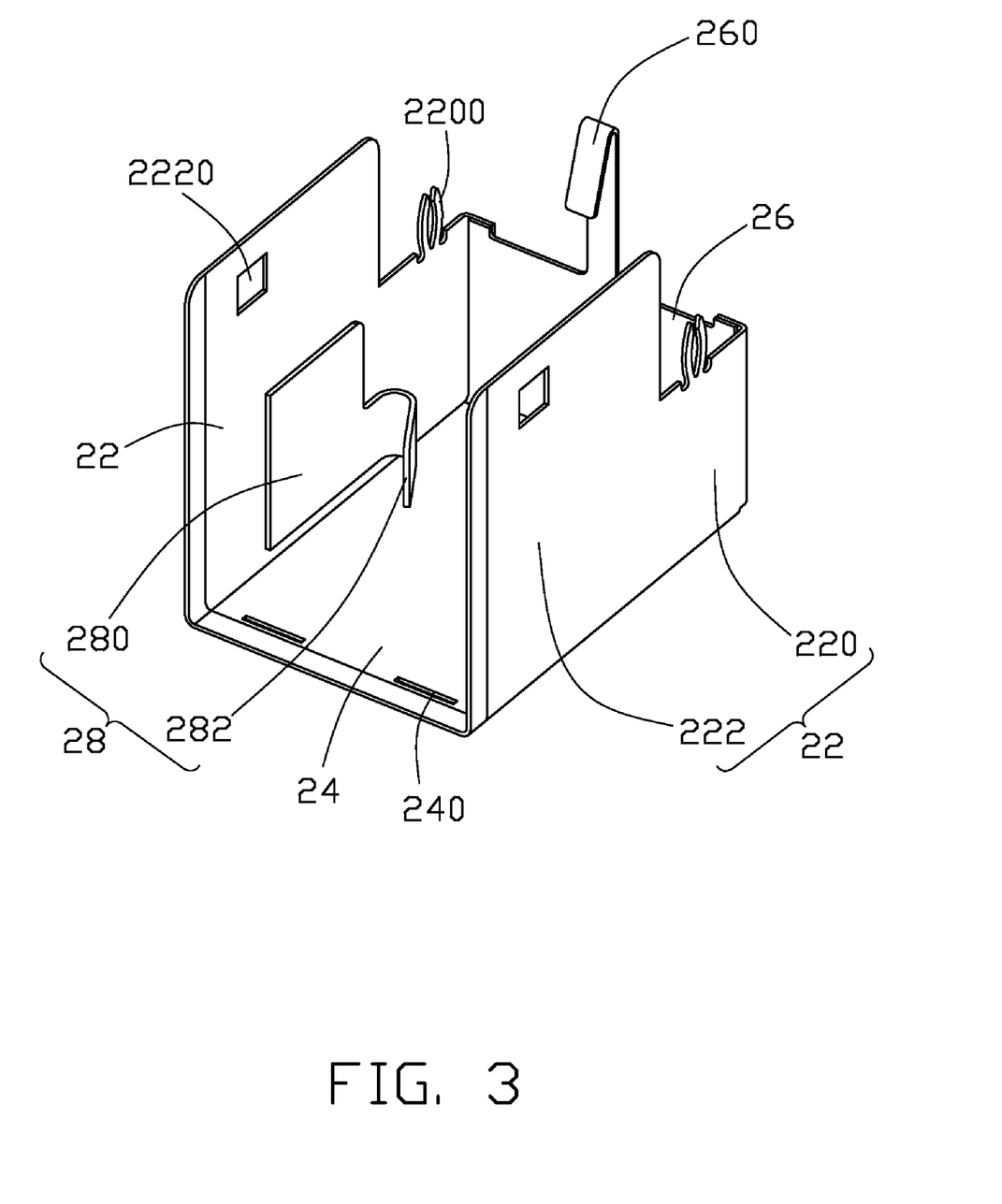
FIG. 3 is a perspective view of a shielding cover of the transceiver cage of FIG. 1

Referring to FIG. 3, a perspective view of the shielding cover 20 of the transceiver cage 100 of FIG. 1 is shown. In the exemplary embodiment, the quantity of the shielding covers 20 is equal to the quantity of the second shield housings 18 (shown in FIG. 1), but FIG. 3 only shows one of the shielding covers 20. The shielding cover 20, electronically connected to the main body 10 (shown in FIG. 1), includes a pair of side shells 22, a bottom shell 24, and a rear shell 26. In the exemplary embodiment, the side shells 22, the bottom shell 24, and the rear shell 26 are formed integrally.

The side shell 22 includes a first part 220 and a second part 222. A height of the first part 220 is substantially equal to a height of the rear shell 26, and is less than a height of the second part 222. A pair of fixing feet 2200 respectively extend from one edge of the first part 220 of the side shell 22, for inserting into corresponding fixing holes 44 (shown in FIG. 1) of the circuit board 40. A pair of securing holes 2220 are respectively defined in the second parts 222 of the side shells 22, for engaging with the protrusion portions 1622 (shown in FIG. 2) of the first sidewall 162 to attach the shielding cover 20 to the main body 10.

A hook 260 extends from an edge of the rear shell 26, for traversing a through hole 46 (shown in FIG. 1) of the circuit board 40 to engage with the bent portion 1240 (shown in FIG. 4) of the main body 10. A pair of slots 240 is defined in the bottom shell 24, for receiving the latching member 1822 (shown in FIG. 5) of the main body 10. A pair of spring arms 28 are electronically connected to the side shells 22, for abutting against the transceiver module received in the second shield housing 18 (shown in FIG. 2). Each spring arm 28 includes a fixing part 280 and a curved part 282. The fixing part 280 is electronically connected to the side shell 22. The curved part 282 extends opposite to the rear shell 26 from the fixing part 280. In the exemplary embodiment, the spring arms 28 are jointed to inner surfaces of the side shells 22.

Figure 4:
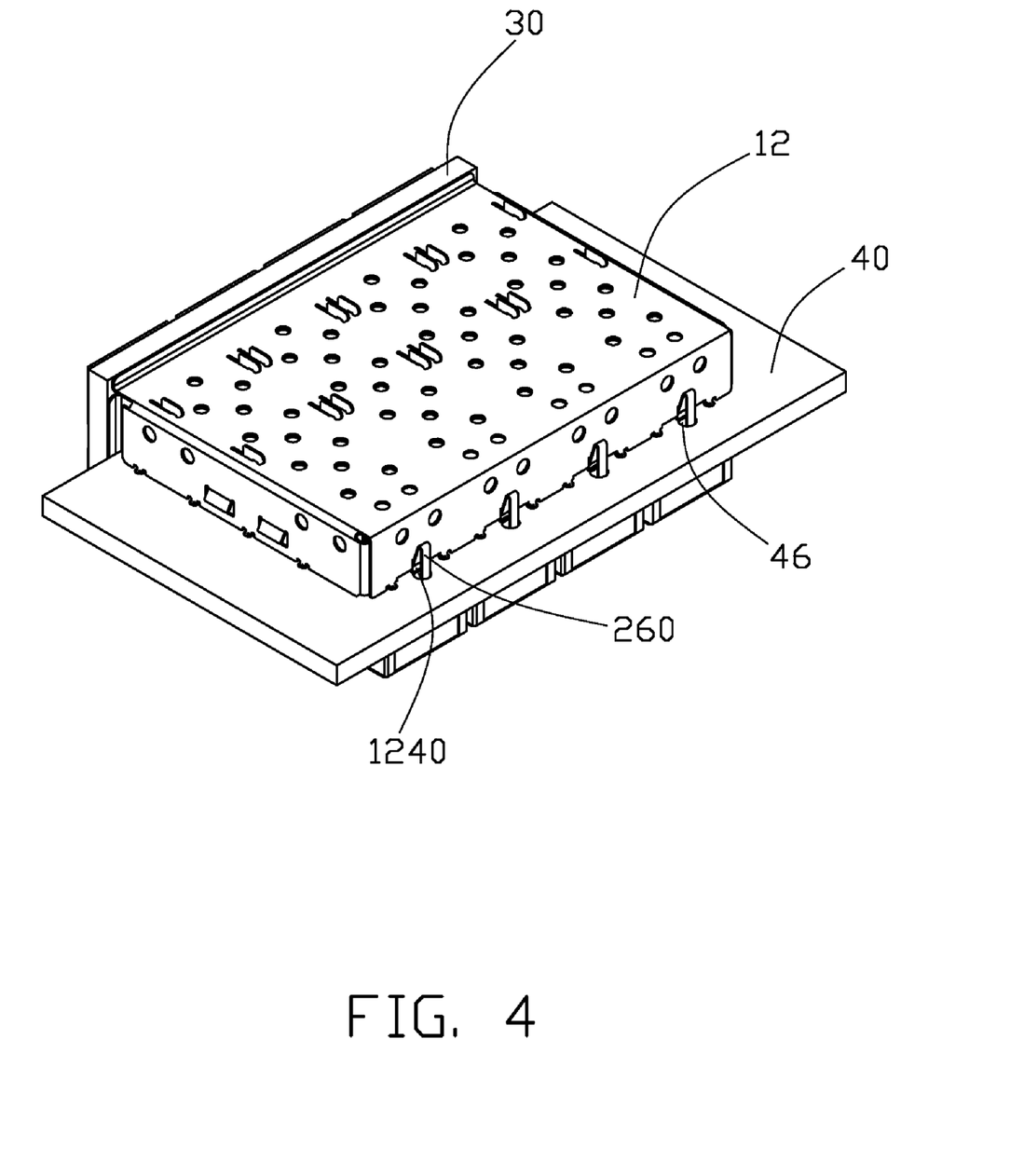
FIG. 4 is an assembled view of the transceiver cage of FIG. 1.
Figure 5:
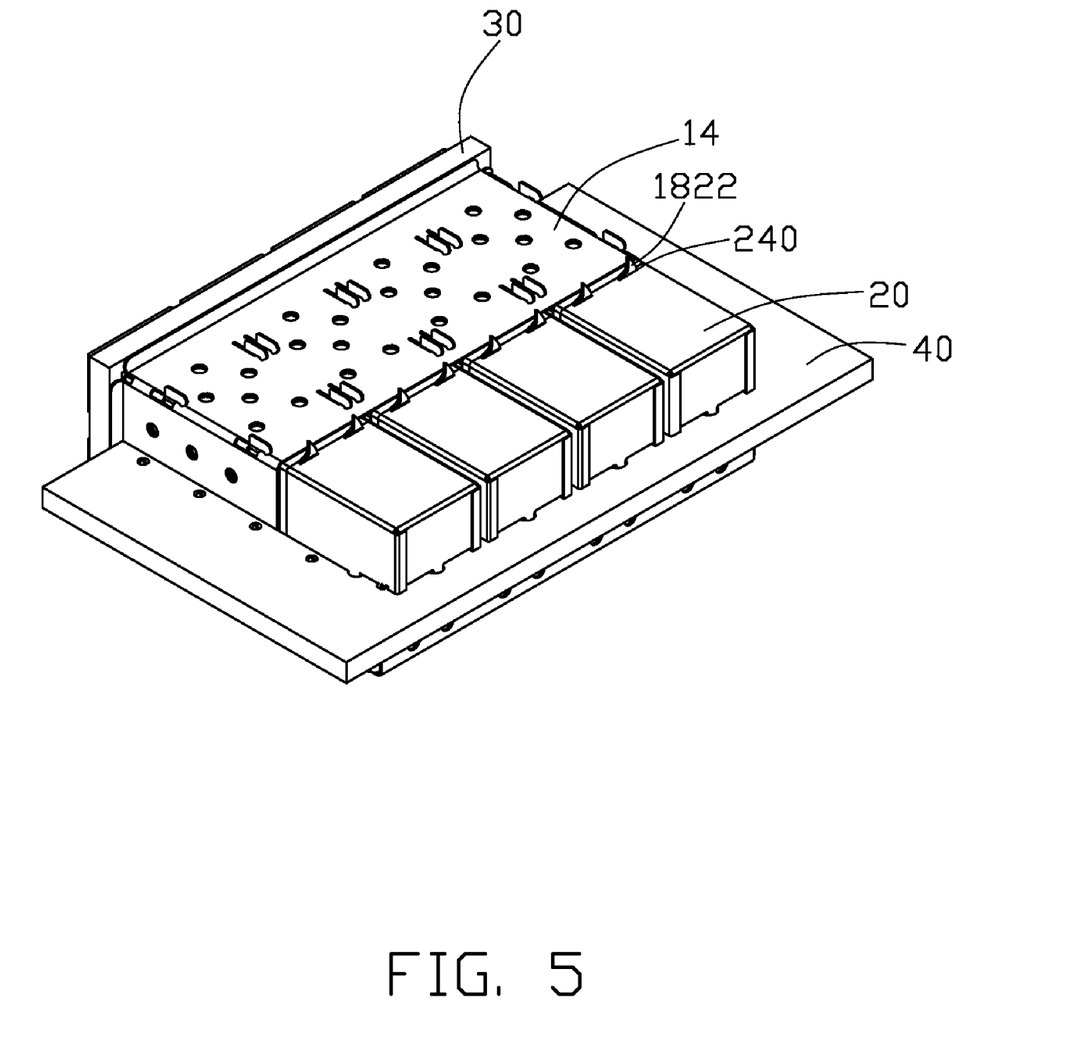
FIG. 5 is an inverted view of FIG. 4.
Figure 6:
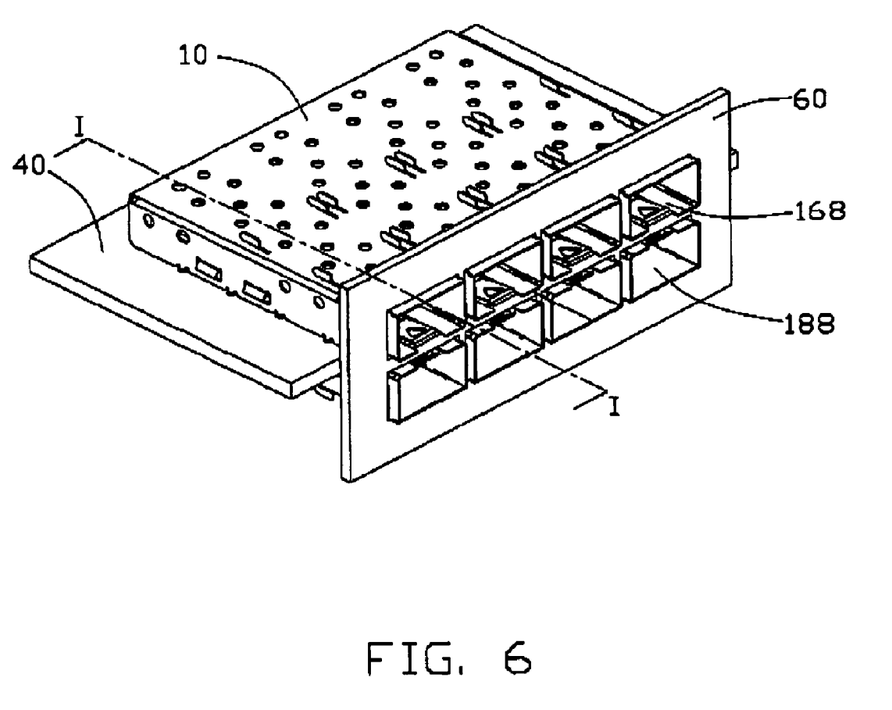
FIG. 6 is an assembled view of the transceiver cage and the bezel of FIG. 1
Figure 6A:
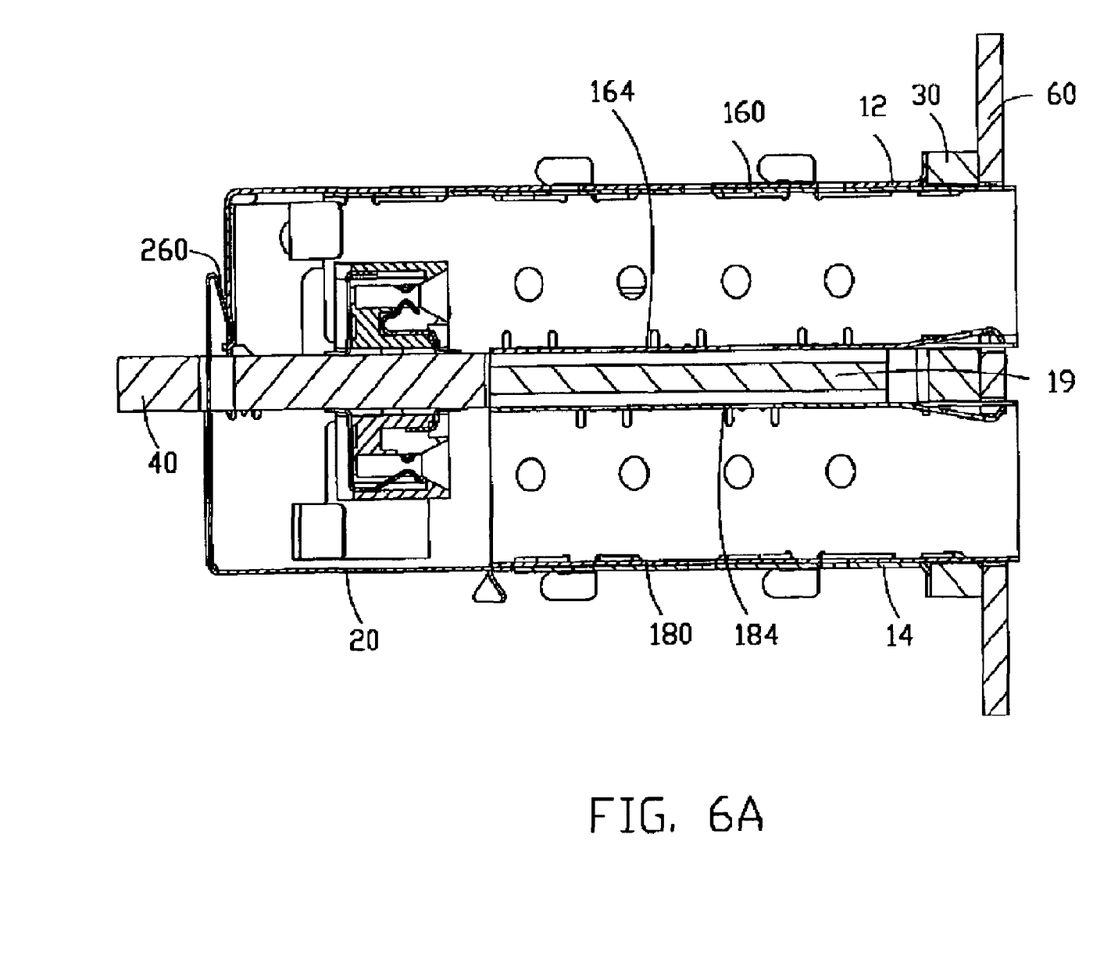
FIG. 6A is an enlarged cutaway sectional view taken along I-I line of FIG. 6.

Referring also to FIG. 4, an assembled view of the transceiver cage 100 of FIG. 1 is shown. FIG. 5 is an inverted view of FIG. 4. FIG. 6 is an assembled view of the transceiver cage 100 assembled in the bezel 60 of FIG. 1.

In assembly, firstly, the first shield housing 16 and the second shield housing 18 are attached to the two opposite sides of the interposed board 19 (FIG. 2), and the first shield housing 16, the second shield housing 18, and the interposed board 19 are coupled to the top cover 12 and the bottom cover 14 to form the main body 10, then the outer sideboards 122 of the top cover 12 are located at outsides of the inner sideboards 144 of the bottom cover 14 and overlap the inner sideboards 144. Secondly, seen in FIG. 1, the main body 10 is mounted in the aperture 42 of the circuit board 40 and crosses over the circuit board 40, and the fixing feet 126 of the main body 10 are inserted into the corresponding fixing holes 44 of the circuit board 40. Thirdly, the hook 260 traverses the through hole 46 of the circuit board 40 to engage with the bent portion 1240 (FIG. 4) of the main body 10; the fixing feet 2200 (FIG. 3) of the shielding cover 20 are inserted into the corresponding fixing holes 44 (FIG. 1) of the circuit board 40; the securing holes 2220 (FIG. 3) are engaged with the protrusion portions 1622 (FIG. 2) of the main body 10; and the latching members 1822 (FIG. 5) of the main body 10 are inserted into the corresponding slots 240 (FIG. 3) of the shielding cover 20, and are distorted to latch the shielding cover 20 on the main body 10. Lastly, the front end of the main body 10 is inserted into the openings 300 (FIG. 1) of the gasket 30, the fringes 1200, 1400 are contacted to the gasket 30, and then the transceiver cage is formed. After assembly, the transceiver cage is attached to the bezel 60, and the bezel 60 contacts the gasket 30 (FIG. 1) to shield electromagnetic interference.

In the exemplary embodiment, the transceiver cage is laid across two opposite surfaces of the circuit board 40; that is, the first shield housing 16 and the second shield housing 18 are located on opposite sides of the circuit board 40.

While exemplary embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A transceiver cage, comprising:
    at least one first shield housing, comprising a first upper wall, a first lower wall, and a pair of first sidewalls electronically connected to the first upper wall and the first lower wall, lengths of the first sidewalls being substantially equal to a length of the first upper wall, a length of the first lower wall being less than the lengths of the first sidewalls and the first upper wall, and the first upper wall, the first sidewalls, and the first lower wall cooperatively surrounding a first receiving space comprising a front open end and a back open end;
    at least one second shield housing stacked on the at least one first shield housing, comprising a second upper wall, a second lower wall, and a pair of second sidewalls electronically connected to the second upper wall and the second lower wall, lengths of the second upper wall, the second sidewalls, and the second lower wall being substantially equal to the length of the first lower wall of the first shield housing;
    a top cover, comprising a top board, a pair of outer sideboards, and a rear board, the rear board electronically connected with the top board and the outer sideboards, for shielding electromagnetic interference, the outer sideboards extending along the first sidewalls of the first shield housing from the top board, heights of the outer sideboards being substantially equal to heights of the first sidewalls of the first shield housing, and a plurality of fixing feet extending from edges of the outer sideboards; and
    a bottom cover, comprising a bottom board and a pair of inner sideboards, lengths of the bottom board and the inner sideboards being substantially equal to the length of the first lower wall of the first shield housing, the inner sideboards lapping over the outer sideboards of the top cover, and the bottom cover electronically connected with the top cover to receive the first shield housing and the second shield housing.

2. The transceiver cage of claim 1, further comprising an interposed board disposed between the first shield housing and the second shield housing.

3. The transceiver cage of claim 1, further comprising at least one shielding cover, electronically connected to the at least one second shield housing, for shielding a rear opening of the second shield housing, and comprising a bottom shell, a rear shell, and a pair of side shells electronically connected with the bottom shell and the rear shell.

4. The transceiver cage of claim 3, wherein the shield cover further comprises a pair of spring arms respectively electronically connected to the side shells, for abutting against a transceiver module received in the second shield housing, and the first shield housing further comprises a pair of spring arms for abutting against a transceiver module received in the first shield housing.

5. The transceiver cage of claim 3, wherein the top cover comprises at least one bent portion bending from the rear board, and the shielding cover comprises a hook extending from the rear shell to engage with the bent portion of the top cover.

6. The transceiver cage of claim 3, wherein the shielding cover comprises at least one slot defined on the bottom shell, and the second shield housing comprises at least one latching member for inserting into the slot of the bottom shell of the shielding cover.

7. The transceiver cage of claim 3, wherein the shielding cover comprises a pair of securing holes respectively defined on the side shells, the first shield housing comprises a pair of protrusion portions formed on first sidewalls to engaging with the securing holes of the shielding cover.

8. The transceiver cage of claim 3, wherein the quantity of the shielding covers is equal to the quantity of the second shield housings.

9. A transceiver cage, disposed on a circuit board, comprising:
    at least one first shield housing, comprising a first upper wall, a first lower wall, and a pair of first sidewalls electronically connected to the first upper wall and the first sidewalls, lengths of the first sidewalls being substantially equal to a length of the first upper wall, a length of the first lower wall being less than the lengths of the first sidewalls and the first upper wall, and the first upper wall, the first sidewalls, and the first lower wall cooperatively surrounding a first receiving space comprising a front open end and a back open end;
    at least one second shield housing stacked to the at least one first shield housing, comprising a second upper wall, a second lower wall, and a pair of second sidewalls electronically connected to the second upper wall and the second lower wall, lengths of the second upper wall, the second sidewalls, and the second lower wall being substantially equal to the length of the first lower wall of the first shield housing;
    a top cover, comprising a top board, a pair of outer sideboards, and a rear board, the rear board electronically connected with the top board and the outer sideboards, for shielding electromagnetic interference, the outer sideboards extending along the first sidewalls of the first shield housing from the top board, and a plurality of fixing feet extending from the outer sideboards; and a bottom cover, comprising a bottom board and a pair of inner sideboards, lengths of the bottom board and the inner sideboards being substantially equal to the length of the first lower wall of the first shield housing, the inner sideboards lapping over the outer sideboards of the top cover, and the bottom cover electronically connected with the top cover to receive the first shield housing and the second shield housing;

wherein an aperture and a plurality of fixing holes are defined on the circuit board, one part of the transceiver cage is disposed in the aperture, and the fixing feet of the top cover is inserted into the fixing holes of the circuit board.

10. The transceiver cage of claim 9, wherein the top cover comprises at least one bent portion, and the shielding cover comprises a hook extending from the rear shell to engage with the bent portion of the top cover.

11. The transceiver cage of claim 10, wherein at least one through hole correspond to the hook of the shielding cover is defined on the circuit board, and the hook traverses the through hole to engage with the bent portion.

* * * * *